June 26, 1956 L. W. FAHRNER 2,752,160
HIGH SPEED CUTTER FOR USE IN CUTTING
STRAW, HAY OR THE LIKE
Filed Feb. 3, 1953 2 Sheets-Sheet 1
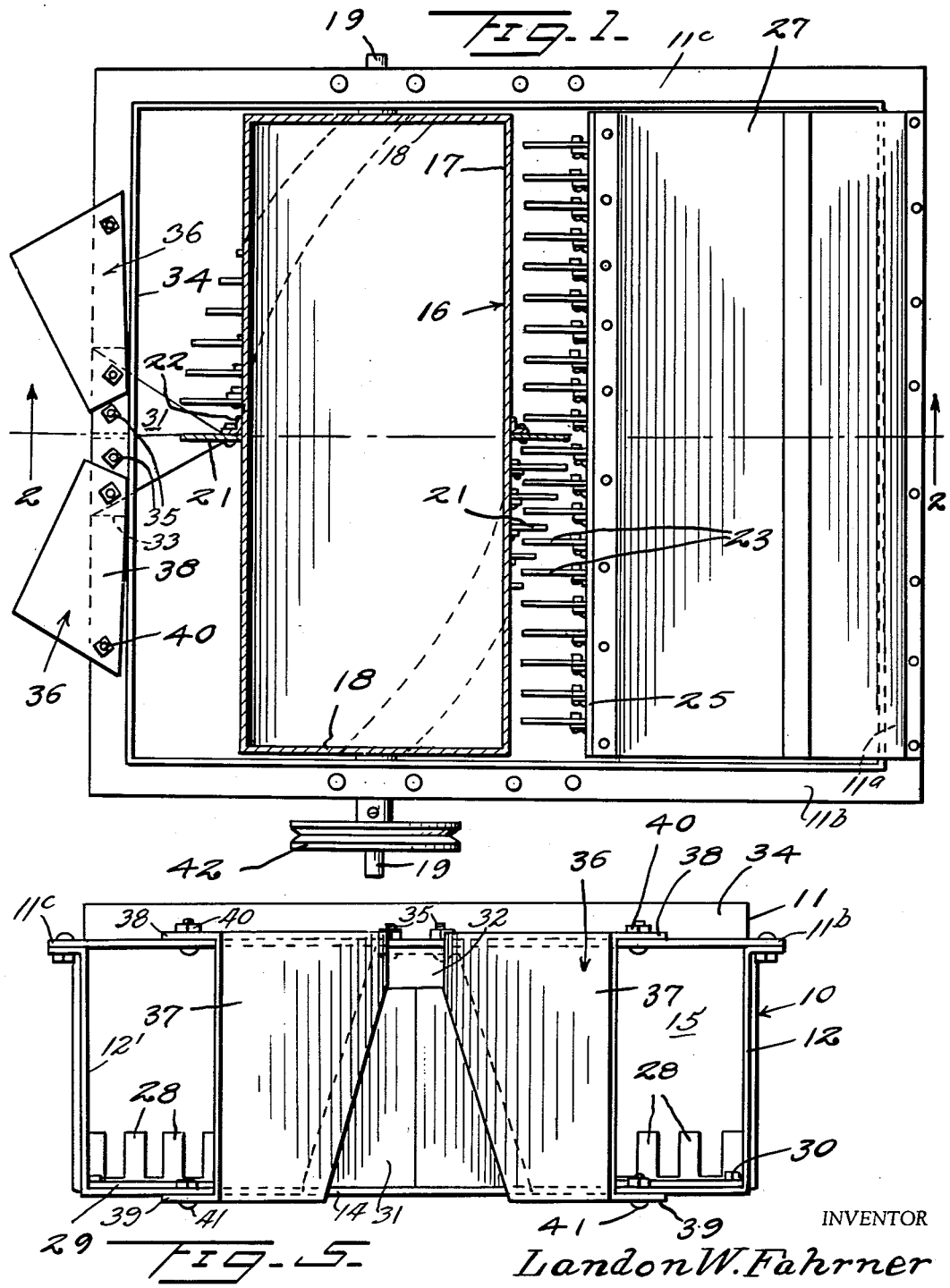
INVENTOR
Landon W. Fahrner
BY Kimmel & Crowell
ATTORNEYS

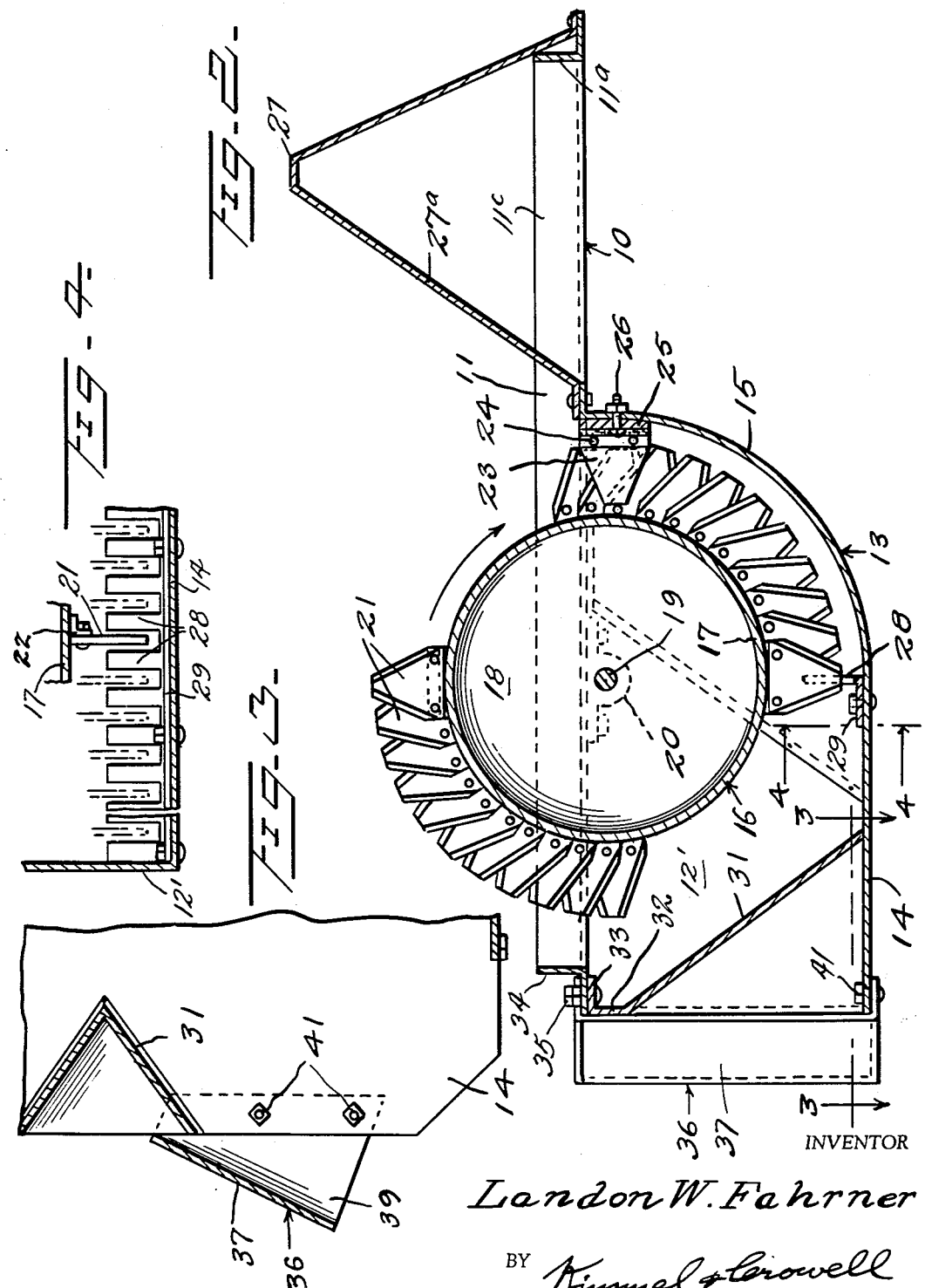

United States Patent Office 2,752,160
Patented June 26, 1956

2,752,160

HIGH SPEED CUTTER FOR USE IN CUTTING STRAW, HAY, OR THE LIKE

Landon W. Fahrner, Helena, Mont., assignor to V. Perry Alloway, Spokane, Wash.

Application February 3, 1953, Serial No. 334,898

3 Claims. (Cl. 275—3)

This invention relates to a high speed cutter for use in cutting straw, hay or the like.

An object of this invention is to provide a combined cutter and spreader which may be mounted on a harvester for finely cutting the straw and for spreading the straw upon the ground.

Another object of this invention is to provide a combined cutter and spreader which is so constructed and arranged that the straw or other material will not become clogged in the machine and will not wrap around the rotary cutter.

A further object of this invention is to provide a combined cutter and spreader wherein the primary stationary cutters are mounted on a supporting bar which is mounted in a manner whereby the bar may be reversed so that double edge cutters may be used and a sharp or new cutting edge may be provided in a relatively short time.

The cutter or grinder herein disclosed may be used as an attachment for a harvester, or the device may be used as a material shredder used in covering row crops or the like.

With the above and other objects in view, my invention consists in the arrangement, combination and details of construction disclosed in the drawings and specification, and then more particularly pointed out in the appended claims.

In the drawings—

Figure 1 is a plan view, partly in horizontal section, of a high speed cutter constructed according to an embodiment of this invention, Figure 2 is a sectional view taken on the line 2—2 of Figure 1, Figure 3 is a fragmentary sectional view taken on the line 3—3 of Figure 2, Figure 4 is a fragmentary sectional view taken on the line 4—4 of Figure 2, Figure 5 is a detailed front elevation of the cutter housing with the cutter removed therefrom.

Referring to the drawings, the numeral 10 designates generally a housing which is formed of a top frame 11 consisting of front and rear angle members 11a and 34 joined by opposite side angle members 11b and 11c, depending end walls 12, and a bottom wall 13. The bottom wall 13 is formed with a horizontal rear portion 14 and an upwardly curved forward portion 15.

A rotary cutter generally designated as 16 is rotatably disposed in the housing 10, and is formed of a cylindrical body 17 having end heads 18 with stub shafts 19 secured to and extending from the heads 18 and journalled in bearings 20 which are carried by the frame 11. The cylindrical body 17 has fixed thereto a plurality of V-shaped blades 21, with the blades 21 fixed to angle members 22 which are welded or otherwise secured to the exterior of the cylindrical body 17. The blades 21 have keen edges on their opposite outwardly convergent edges so that the blades 21 may be reversed as to their operating edges when the first operating edge becomes dull.

The blades 21 are arranged spirally about the body 17 as shown in Figures 1 and 2. A plurality of stationary V-shaped blades 23 are secured by fastening means 24 to a supporting bar 25. The supporting bar 25 is disposed horizontally at the upper forward end of the curved wall 15, and is secured to the inner side of the wall 15 by removable fastening means 26.

The blades 21 engage loosely between the stationary blades 23 so that the straw or other material which is fed into the housing will be cut relatively finely by the rotating blades 21 and the cooperating stationary blades 23.

An inverted V-shaped straw or material guide 27 is fixed to the frame or housing 10, projecting upwardly and forwardly therefrom, and is also secured to the angle frame 11, as shown in Figure 2. The rear wall 27a of the guide 27 is adapted to feed the material downwardly into the housing 10. A plurality of upstanding stationary blades 28 which are rectangular in front elevation, as shown in Figure 5, are fixed relative to a base bar 29 which is secured by fastening means 30 to the bottom wall 14. The blades 21 also move between the blades 28 so that the straw or material which is being cut or ground will be additionally cut up by cooperation of blades 21 and blades 28. When the ground material passes the blades 28, the material is directed outwardly and laterally in a spread formation by means of a V-shaped spreader 31 which is welded or otherwise fixed to the bottom wall 14. The spreader 31 has the apex thereof disposed inwardly and inclined upwardly and rearwardly, as shown in Figure 2.

A flat upwardly projecting extension 32 projects from the upper rear end of the spreader 31 and terminates in a horizontal flange 33 which engages beneath the rear angle frame member 34. The flange 33 is secured to the angle member 34 by fastening devices 35. In the event it is desired to spread the material laterally of the line of movement of the cutting device when secured to a harvester or other mobile element, the material is directed by means of a pair of lateral spreaders generally indicated at 36. The lateral spreaders 36 are each formed with a vertical plate 37, and upper and lower flanges 38 and 39. The flange 38 engages over the rear frame bar 34 and is secured thereto by fastening means 40. The flange 39 engages beneath the bottom wall 13 and is secured thereto by fastening means 41.

The inner edge of the vertical plate 37 overlaps the outer rear edge of the spreader 31 as indicated in Figure 5. It will be understood that one or two of these lateral spreaders 36 may be used, depending on whether it is desired to direct the material to one side or to both sides of the line of movement of the device.

The body 17 has secured to one stub shaft 19 thereof a pulley 42 which is adapted to be connected to a source of driving means for rapidly rotating the cutter 16 during the cutting operation.

In the use and operation of this device, the material which is to be ground or finely cut is fed into the housing 10 over the guide 27. It will be understood that this device may be combined with the discharge end of a harvester where the straw is being discharged from the harvester. The straw or other material will move downwardly over the guide 27 into the housing 10 and the rapid rotation of the cutter 16 will effect initial grinding or cutting of the straw between the blades 21 and 23. As the cut material moves downwardly on the concave side of inner wall 15, the initially cut material will contact with lower stationary blades 28 and the material will be cut or ground by movement of the blades 21 through the spaces between the blades 28. The flat blades 28 in cooperation with the cutting blades 21 will further cut the material coming therebetween and strip material from the body 17 to prevent wrapping of the material about the body 17 and clogging of the machine. As the material moves rearwardly past the blades 28, the material will be divided by means of the spreader 31 and will be discharged from the rear end of the housing 10. Where it is desired to have the cut material spread laterally on the ground, one or both of the lateral spreaders 36 may be secured to the rear of the housing structure 10.

I do not mean to confine myself to the exact details of construction herein disclosed, but claim all variations falling within the purview of the appended claims.

What I claim is:

1. A rotary cutter comprising a substantially rectangular frame formed of angle members and including a pair of spaced substantially parallel side frame members and a pair of spaced substantially parallel front and rear frame members positioned at substantially 90° with respect to said first pair of frame members, a housing comprising a pair of oppositely disposed end walls, a flat bottom wall, and a front wall curving upwardly and forwardly from said bottom wall and terminating at its upper end in a forwardly extending flange, means connecting the upper ends of said end walls with said side frame members with said upper end of said front wall being positioned intermediate said front and rear frame members, an inverted substantially V-shaped guide member having one of its arms secured to said front frame member and its other arm secured to said flange, a plurality of spaced longitudinally aligned cutting blades fixedly secured to said front wall adjacent said upper end thereof, a plurality of horizontally aligned cutting blades fixedly secured to the forward end of said bottom wall, a cylinder, means journalling said cylinder on said end walls, a plurality of spirally positioned cutting blades mounted on said cylinder and projecting therefrom, said last named blades passing between the individual blades of the respective pluralities of said fixed blades upon rotation of said cylinder, a vertical V-shaped baffle having an end thereof fixedly secured to said bottom wall adjacent the outer end thereof and adjacent a side thereof, means fixedly securing the other end of said baffle to said rear frame member, and at least one vertically extending spreader plate having an upper and lower flange, and means securing said upper and lower flanges to said rear frame member and to the outer end of said bottom wall, respectively, with the inlet side of said spreader being positioned adjacent a discharge side of said baffle.

2. A rotary cutter comprising a housing having a pair of oppositely disposed end walls, a bottom wall connecting the lower ends of said end walls, said bottom wall being integrally formed with a forwardly and upwardly inclined front wall, a substantially open rectangular frame including two oppositely disposed pairs of frame members, means connecting the upper ends of said end walls with one pair of said frame members, respectively, guide means connected to one of the other of said pair of frame members and to the upper end of said front wall, a plurality of cutting blades fixed to and disposed within said housing, a rotor mounted for rotation between said end walls and having a cutting blade mounted on each of a plurality of projections therefrom, said blades being disposed for passage between adjacent ones of said fixed blades upon rotation of said rotor.

3. A rotary cutter as defined in claim 2, said guide means comprising an inverted substantially V-shaped member having an arm thereof secured to said one of the other of said pair of frame members, and the other arm of said V-shaped member connected with said upper end of said front wall.

References Cited in the file of this patent
UNITED STATES PATENTS

| | | |
|---|---|---|
| 563,006 | Barnes | June 30, 1896 |
| 2,148,547 | Fiese et al. | Feb. 28, 1939 |
| 2,213,906 | Ebersol | Sept. 3, 1940 |
| 2,281,846 | Klein | May 5, 1942 |
| 2,626,159 | Thompson | Jan. 20, 1953 |
| 2,670,775 | Elofson | Mar. 2, 1954 |